July 24, 1956 L. D. BARTLEY 2,755,840
MACHINE FOR ADHESIVELY ASSSEMBLING SCREW THREADED PARTS
Filed April 8, 1954 2 Sheets-Sheet 1

Inventor
Lewis D. Bartley
by Wright, Brown,
Quinby & May
Attys.

July 24, 1956 L. D. BARTLEY 2,755,840
MACHINE FOR ADHESIVELY ASSSEMBLING SCREW THREADED PARTS
Filed April 8, 1954 2 Sheets-Sheet 2
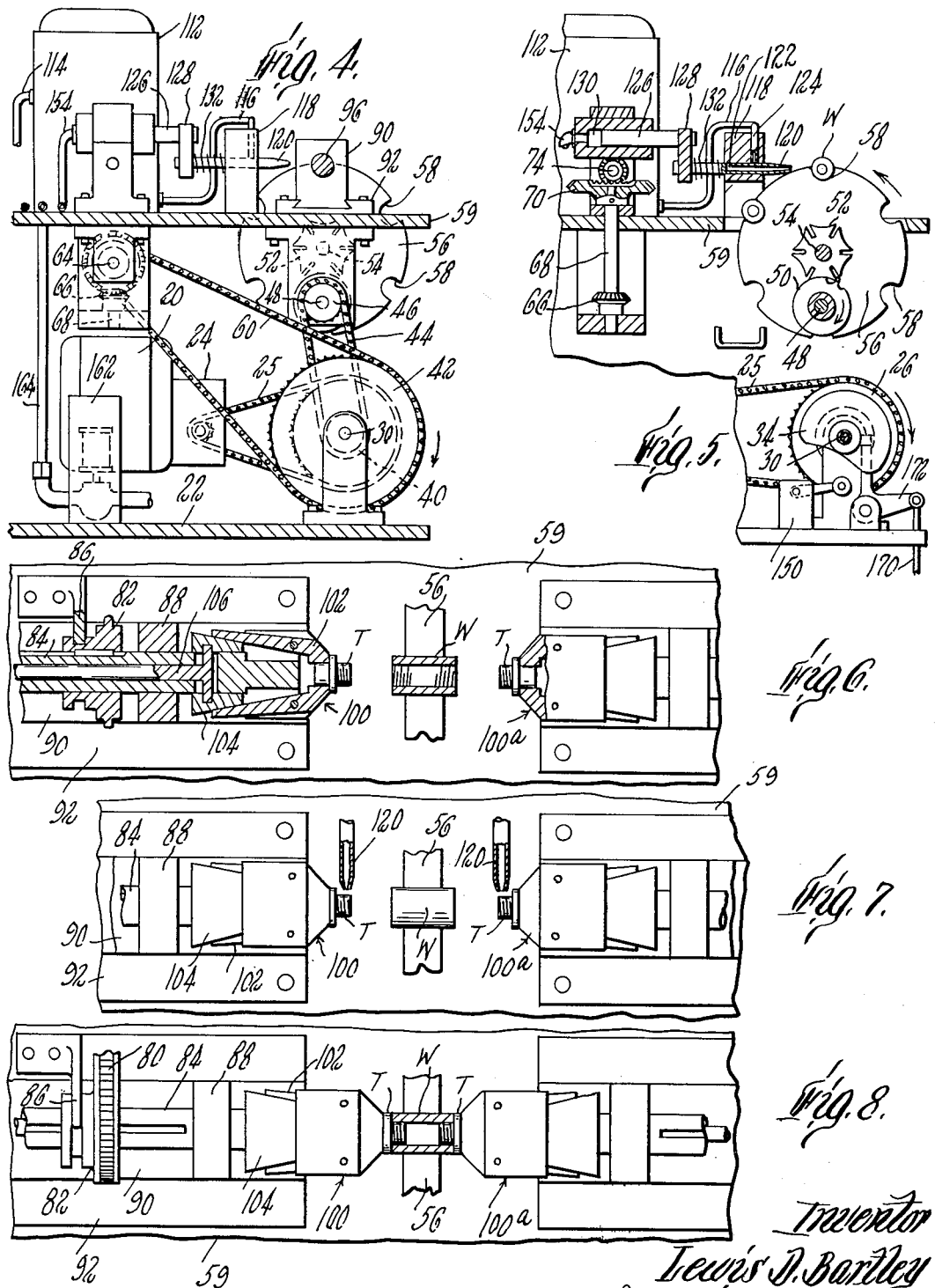
Inventor
Lewis D. Bartley
by Wright, Brown,
Quinby + May Attys.

United States Patent Office 2,755,840
Patented July 24, 1956

2,755,840

MACHINE FOR ADHESIVELY ASSEMBLING SCREW THREADED PARTS

Lewis D. Bartley, Newburyport, Mass.

Application April 8, 1954, Serial No. 421,941

4 Claims. (Cl. 154—1.6)

This invention relates to a machine for assembling three-part objects consisting of a small ceramic tube into the ends of which two hollow metal elements are screw-threaded. On the thread of each of the metal members a tiny drop of a liquid cement is deposited before the elements are screwed into the ends of the tube. The metal elements are then simultaneously advanced to the ends of the tube and are rotated to screw the threaded portions into the ends of the tube. The assembled article is then discharged.

For a more complete understanding of the invention reference may be had to the following description thereof and to the drawings, of which Figure 1 is a plan view of a machine embodying the invention;

Figure 4 is a section on the line 4—4 of Figure 1;

Figure 5 is a section on the line 5—5 of Figure 1;

Figure 6 is a fragmentary plan view, on a larger scale, of work-holding devices, portions being broken away to show in section; and Figures 7 and 8 are plan views of the mechanism shown in Figure 6, showing subsequent steps of operation.

Figure 1:
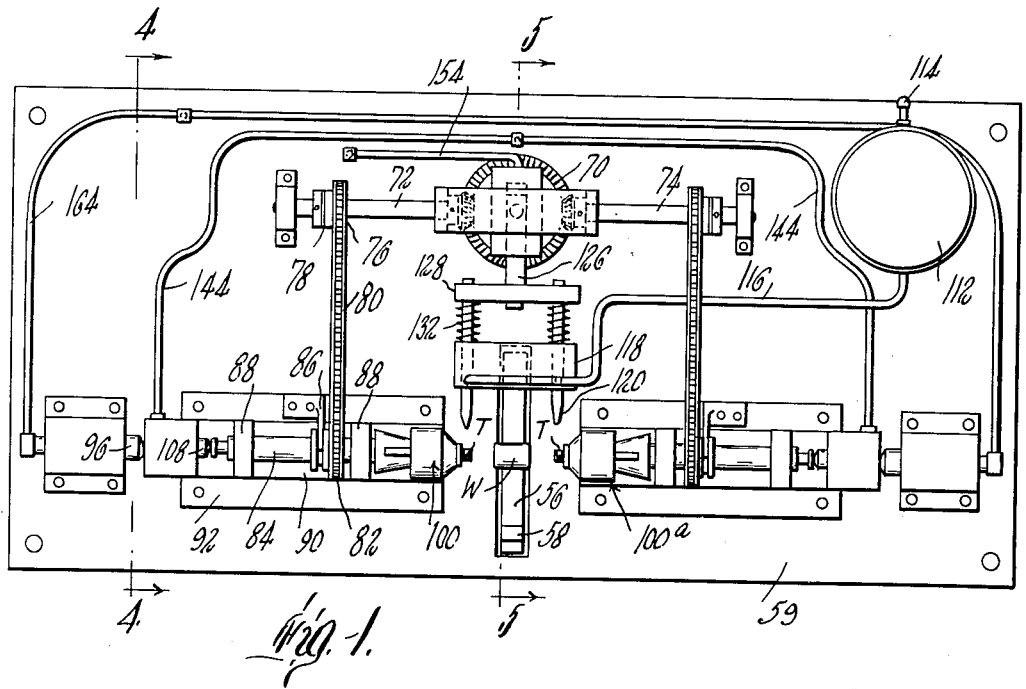

The machine illustrated on the drawing performs the following operations. First, work-pieces consisting of small ceramic tubes are transferred one at a time from a loading station to an assembling station, and are then discharged. Second, a pair of aligned chucks are closed to grip small screw-threaded metal pieces which are to be screwed into the ends of the tube at the assembling station. Third, two cement guns are operated to deposit small droplets of liquid cement on the threaded parts of said metal pieces. Fourth, the chucks are projected toward each other and are rotated to screw the metal pieces into the ends of the ceramic tube. With the exception of the transferring mechanism, these mechanisms are pneumatically operated, and the operations are controlled by valves which are actuated by solenoids. The solenoids are controlled by switches operated by cams on a common shaft as hereinafter described.

The driven parts of the machine may all be conveniently operated by a single electric motor 20 mounted on a base 22. The motor is connected through suitable reduction gearing 24 and a chain 25 to a one-revolution clutch 26 on a cam shaft 30. On this shaft are fixed a cam 32 to control the chuck-tightening mechanism, a cam 34 to control the cement depositing mechanism, and a cam 36 to control the chuck projecting mechanism. Also mounted on the shaft 30 are a small sprocket wheel 40 and a large sprocket wheel 42. The small wheel 40 is connected by a chain 44 to another sprocket wheel 46 which is on a countershaft 48 with a pin gear 50. The pin gear meshes with a slot wheel 52 on a shaft 54 to impart intermittent movement thereto. On this shaft is also mounted a feed wheel 56 having peripheral notches 58 to carry tubes W from a loading station to an assembling station. The feed wheel projects up through an opening in an upper table 59 of the main frame and is so situated relatively to the chucks that the notch carrying a work-piece is at the top of the circumference when the work-piece is at the assembling station.

Figure 2:
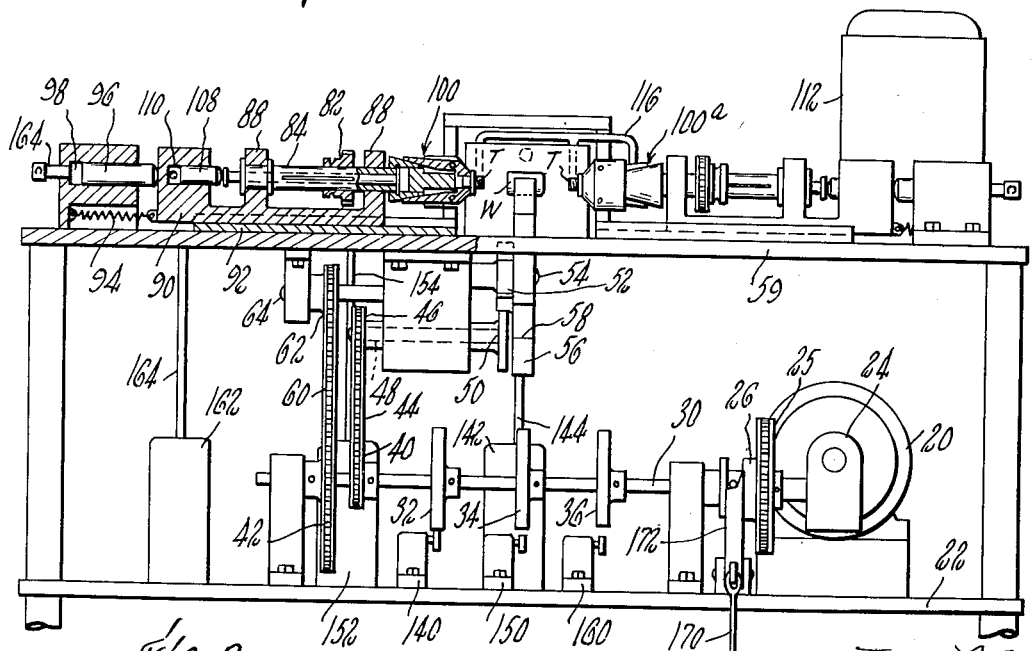
Figure 2 is a front elevation of the same.
Figure 3:
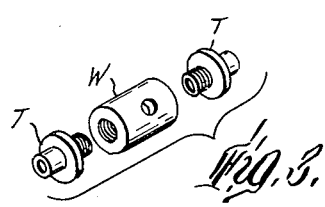
Figure 3 is an exploded perspective view of the article to be assembled by the machine.

The large sprocket wheel 42 is connected by a chain 60 to a sprocket wheel 62 on a shaft 64 which is connected by mitre gears 66 to a vertical shaft 68. On the upper end of the shaft 68 is a mitre gear 70 which turns two horizontal shafts 72 and 74 in opposite directions. Loose on the shaft 72 is a sprocket wheel 76 which is frictionally driven by the shaft through a slip-clutch 78. The sprocket wheel 76 is connected by a chain 80 to a sprocket wheel 82 keyed to a horizontal hollow shaft 84 so as to permit axial movement of the shaft while the sprocket wheel is held against such movement by a fixed bracket 86 which projects into a circumferential groove in the hub of the sprocket wheel. The shaft is carried in bearings 88 which are mounted on or are a part of a movable carriage 90 which can slide in the direction of the axis of the shaft 84 on a bed 92 which is mounted on the table 59 of the main frame. A suitable spring 94 pulls the carriage 90 toward the left (Figure 2). A pneumatic plunger 96 abuts the carriage to push it toward the right when air is supplied under pressure in the chamber 98 behind the plunger.

The shaft 84 carries a chuck 100 at its forward end to grip a threaded metal tip T which is to be screwed into an end of the work piece W. The chuck includes a number of rocking jaws 102 which are moved into gripping position by the advance of a wedge 104 operated by a rod 106 within the shaft 84. The rod 106 is pushed by a pneumatic plunger 108 when air under pressure is admitted to a chamber 110 behind this plunger. Suitable spring means (not shown) may be employed to retract the rod 106.

The shaft 74 is operatively connected with a chuck 100ª by similar mechanism the description of which need not be repeated. Since the shafts 72 and 74 are simultaneously operated from the same source, the movements of the parts connected thereto are symmetrically equal and opposite.

Just before each pair of tips T are screwed into the ends of a work-piece W, a droplet of viscous liquid cement is applied to the threaded portion of each tip. For this purpose a closed tank 112 of such cement is mounted on the table 59. Pressure is maintained in the tank by a connection 114 to a source of air under pressure (not shown). A discharge pipe 116 from the tank leads to a valve block 118 which contains two similar valves, one of which will be described. Each of these valves comprises a nozzle tube 120 (Figure 5) which is slidable in the block 118. The tube 120 has a lateral hole 122 which moves into registry with a passage 124 in the block when the tube is projected forward. The pipe 116 leads from the tank 112 to the passage 124 and keeps the passage filled with cement under pressure. The tubes 120 are advanced by a plunger 126 attached to them by a cross-head 128 when air under pressure is admitted to a chamber 130 behind the plunger 126. A spring 132 may be employed to retract each plunger when the air is released.

For the operation of the pneumatic plungers hereinbefore mentioned, the cam 32 closes a switch 140 in a circuit which causes a solenoid to open a valve, the solenoid and valve being of conventional structure enclosed in a casing 142 from which an air pipe 144 leads to the chambers 110 to actuate the jaws 102 of the chucks 100 and 100ª.

The cam 34 operates a switch 150 which opens a valve in a casing 152 connected by an air pipe 154 to the chamber 130 to project the cement-applying tubes 120.

The cam 36 operates a switch 160 which opens a valve in a casing 162 connected by an air pipe 164 to the chambers 98 to advance the chucks 100 and 100ᵃ toward each other.

In operating the machine, a work piece W is placed in the notch 58 of the wheel 56 and tips T are placed in the chucks 100 and 100ᵃ. The one-revolution clutch 26 is tripped in the customary manner by depressing a treadle (not shown) which is connected to the clutch by a rod 170 and bell-crank 172. When the clutch takes hold, the shaft 30 rotates one revolution. The cams 32, 34 and 36 successively operate the plungers 108 to close the chucks 100 and 100ᵃ, operate the plunger 126 to deposit droplets of cement on the threaded portions of the tips T, and operate the plungers 96 to advance the chucks toward each other. If a work piece W has previously been moved into the operating station at the top of the wheel 56, the tips T are moved to the ends of the work-piece. Since the shafts 72 and 74 are driven by the shaft 30, the tips are rotated as they advance and are thus screwed into the ends of the work-piece W. When the tips have gone in as far as they can the friction clutches slip easily. The cams then allow the switches 140 and 160 to open, releasing the tips and retracting the chucks. The pin gear 50 which has been turning in the meantime advances the slot wheel 52 one step to move a notch 58 from the loading station to the operating station.

I claim:

1. In a machine for screwing two threaded elements into the ends of a work-piece having interior threads, means for supporting said work-piece at an operating station, two aligned chucks on opposite sides of said station, fluid actuated means for causing said chucks to grip threaded elements inserted therein, fluid actuated means for depositing droplets of liquid cement on the threads of said elements, fluid actuated means for advancing said chucks simultaneously toward said operating station, means for automatically operating said chuck-actuating means, said cement-depositing means and said chuck-advancing means in sequence, and means for rotating said chucks as they advance.

2. Apparatus as in claim 1, said operating means comprising a motor, a driven shaft, a one-revolution clutch connecting said motor and shaft, a series of cams on said shaft, fluid supply lines for said fluid actuated means, and control means for all said fluid actuated means operated by said cams.

3. Apparatus as in claim 2, means for feeding work pieces to said operating station, said feeding means comprising a disk-like carrier having work-receiving notches in its periphery, means rotatably supporting said carrier with its axis horizontal and a pin gear and slot wheel connection between said carrier and said shaft for intermittent operation of the carrier to move successive notches to the operating station.

4. In a machine for assembling screw threaded parts, chucks for gripping certain of said parts, a closed container for liquid cement, means for maintaining pressure within said container, nozzles movable toward and from said chucks, supply lines from said container to said nozzles, normally closed valves in said supply lines constructed and arranged to open when said nozzles are advanced to positions of proximity to parts gripped by said chucks, and means for advancing said nozzles to said positions of proximity and immediately retracting said nozzles.

References Cited in the file of this patent

UNITED STATES PATENTS

| | | |
|---|---|---|
| 1,462,305 | Snyder | July 17, 1923 |
| 2,367,672 | Cosmo et al. | Jan. 23, 1945 |
| 2,518,038 | Malhiot | Aug. 8, 1950 |
| 2,633,099 | Jorgenson | Mar. 31, 1953 |
| 2,639,497 | Stauffer | May 26, 1953 |